United States Patent [19]

Williams et al.

[11] Patent Number: 5,462,797
[45] Date of Patent: * Oct. 31, 1995

[54] ENERGY CURABLE PRESSURE-SENSITIVE ADHESIVE COMPOSITIONS

[75] Inventors: Jerry W. Williams, Cottage Grove; Robert J. DeVoe, Oakdale; Thomas P. Klun, Lakeland, all of Minn.; George F. Vesley, Hudson, Wis.; Patrick G. Zimmerman, St. Paul, Minn.

[73] Assignee: Minneapolis Mining and Manufacturing Company, St. Paul, Minn.

[*] Notice: The portion of the term of this patent subsequent to Apr. 7, 2009, has been disclaimed.

[21] Appl. No.: 193,518

[22] Filed: Feb. 8, 1994

Related U.S. Application Data

[63] Continuation of Ser. No. 872,134, Apr. 22, 1992, abandoned, which is a continuation of Ser. No. 578,022, Sep. 5, 1990, abandoned.

[51] Int. Cl.$^6$ .............................. C09J 4/02; C09J 133/08; C09J 175/04; B32B 7/12
[52] U.S. Cl. .............................. 428/345; 428/355; 522/4; 522/18; 522/24; 522/28; 522/29; 522/96; 522/174; 522/182
[58] Field of Search .............................. 522/29, 96, 4, 522/18, 174, 24, 28, 182; 428/345, 355

[56] References Cited

U.S. PATENT DOCUMENTS

| | | | |
|---|---|---|---|
| 3,661,618 | 5/1972 | Brookman et al. | 427/505 |
| 3,717,558 | 2/1973 | McGinniss | 204/159.15 |
| 3,855,040 | 12/1974 | Malofsky | 156/310 |
| 4,150,170 | 4/1979 | Lazear | 427/516 |
| 4,181,752 | 1/1980 | Martens et al. | 428/483 |
| 4,330,590 | 5/1982 | Vesley | 428/336 |
| 4,342,793 | 8/1982 | Skinner et al. | 427/44 |
| 4,379,201 | 4/1983 | Heilmann | 428/345 |
| 4,391,687 | 7/1983 | Vesley | 525/330.5 |
| 4,415,615 | 11/1983 | Esmay et al. | 428/40 |
| 4,425,553 | 1/1984 | Rooney et al. | 526/120 |
| 4,446,246 | 5/1984 | McGinniss | 502/155 |
| 4,525,232 | 6/1985 | Rooney et al. | 156/273.3 |
| 4,707,432 | 11/1987 | Gatechair et al. | 430/281 |
| 4,740,577 | 4/1988 | DeVoe et al. | 528/52 |
| 4,785,340 | 11/1988 | Palazzotto et al. | 528/52 |
| 4,849,320 | 7/1989 | Irving | 522/4 |
| 4,898,899 | 2/1990 | Isobe | 524/90 |
| 4,985,340 | 1/1991 | Palazzotto et al. | 528/52 |
| 5,102,924 | 4/1992 | Williams et al. | 522/4 |
| 5,149,586 | 9/1992 | Ishiwata et al. | 428/345 |

FOREIGN PATENT DOCUMENTS

| | | |
|---|---|---|
| 0096500 | 5/1983 | European Pat. Off. . |
| 152377 | 2/1984 | European Pat. Off. . |
| 126712 | 11/1984 | European Pat. Off. . |
| 0172330 | 6/1985 | European Pat. Off. . |
| 0335629 | 10/1989 | European Pat. Off. . |
| 0344911 | 12/1989 | European Pat. Off. . |
| 0344910 | 12/1989 | European Pat. Off. . |
| 3844029 | 7/1989 | Germany . |
| 2110705 | 11/1982 | United Kingdom . |
| 88/02879 | 4/1988 | WIPO . |

OTHER PUBLICATIONS

Herze et al., "Pressure Sensitive Adhesives Obtained by Irradiation", RADCURE '86 Conference Proceedings, 1986.

*Primary Examiner*—Susan W. Berman
*Attorney, Agent, or Firm*—Gary L. Griswold; Walter N. Kirn; Patrick J. O'Connell

[57] ABSTRACT

The present invention provides a pressure-sensitive adhesive composition and a method for producing the same. The pressure-sensitive adhesive composition is produced by the combination of at least one free-radically photopolymerizable monomer and at least one set of polyurethane precursors, and a suitable photoinitiation system consisting of at least one salt of a cationic organometallic complex, an additional free-radical photo initiator and the application of sufficient energy to photopolymerize same by sequential exposure to visible electromagnetic radiation and then to ultraviolet electromagnetic radiation.

19 Claims, No Drawings

ENERGY CURABLE PRESSURE-SENSITIVE ADHESIVE COMPOSITIONS

This is a continuation of application Ser. No. 07/872,134 filed Apr. 22, 1992, now abandoned, which is a continuation of application Ser. No. 07/578,022 filed Sep. 5, 1990, now abandoned.

FIELD OF THE INVENTION

This invention relates to an energy-polymerizable pressure-sensitive adhesive composition comprising a free-radically polymerizable monomer in combination with a set of polyurethane precursors, and as the photoinitiator system, an organometallic complex salt and an additional free-radical initiator, and a method for making same.

BACKGROUND OF THE INVENTION

Various polymeric coatings and articles are produced in processes involving use of organic solvents. Such processes require a latent catalyst or latent reaction promoter which can be activated in a controlled fashion. There is an intense effort by environmentalists, researches, law makers, and industry to promote high solids and 100% solids formulations and processes to reduce or eliminate use of such solvents and attendant costs and environmental contamination.

Various patents, e.g., U.S. Pat. Nos. 4,150,170 (Lazear); 4,181,752 (Martens); 4,330,590 (Vesley); 4,379,201 (Heilmann); and 4,391,687 (Vesley) disclose pressure-sensitive adhesives made via ultraviolet irradiation of a composition consisting of free-radically polymerizable monomers and a free-radical photoinitiator. These patents do not disclose use of more than one type of photopolymerizable monomer system, cationic organometallic photoinitiators, multiple photoinitiaton or use of polyurethanes in photopolymerizable pressure-sensitive adhesive compositions.

U.S. Pat. No. 4,415,615 (Esmay et al.) cellular pressure-sensitive adhesives comprising at least 15% voids.

WO 8802879 (Woods et al.) teaches a free-radically polymerizable composition comprising a free-radically polymerizable material and a photoinitiator system comprising a free-radical photoinitiator and a ferrocenium salt. The composition may contain one or more cationically polymerizable materials. No detail is provided as to the nature of these cationically polymerizable materials, nor do they teach use of multiphotoinitiation for energy irradiation. Polyurethane precursors are not disclosed. Pressure-sensitive adhesives with superior properties are not disclosed.

U.S. Pat. No. 4,849,320, (Irving) teaches an imaging system containing a combination of two different photoinitiators used with two different polymerizable monomers in combination with irradiation at two substantially different wavelengths. The monomers can be acrylate or epoxies or other cationically polymerizable monomers and the photoinitiators can include ferrocenium, onium salts or an alpha cleavage or homolytic bond cleavage photoinitiator. No polyurethane precursors thanes in such a photo initiation system is taught, nor pressure-sensitive adhesives.

E.P.O. 335629 (Rohm and Haas) discloses photoresists and printing plates comprising cationically polymerizable materials in combination with free-radically polymerizable materials, and photoinitiators for both materials. A photopolymerization process involving exposure to varied wavelengths of radiation is also disclosed. No polyurethanes are taught, nor any pressure-sensitive adhesives.

U.S. Pat. No. 3,661,618 (Brookman et al.) discloses a process wherein a solvent-free coating primarily comprising an acrylic ester monomer, is polymerized to a tacky state by being subjected to a beam of high energy electrons. Use of photoinitiators, multiple photoinitiation processes or polyurethanes is not disclosed.

E.P.O. 344,910, (Palazzotto et al.) discloses a photopolymerizable composition comprising a polymeric precursor, an optional photosensitizer and a two-component curing agent. Polymeric precursors are selected from ethylenically unsaturated monomers, epoxy and polyurethane monomers and specific mixtures thereof. The curing agent contains an organometallic salt and an onium salt. The compositions are generically disclosed to be useful as adhesives. No specific adhesive compositions or pressure-sensitive adhesives are disclosed.

E.P.O. 344,911 (DeVoe et al.) discloses a polymerizable composition comprising a polymeric precursor, a curing agent containing an organometallic salt and optionally a solvent. Polymeric precursors are selected from ethylenically-unsaturated monomers alone, and in combination with either polyurethane precursors or epoxy monomers. The compositions are generically disclosed to be useful as adhesives. No specific adhesive compositions or pressure-sensitive adhesives are disclosed.

U.S. Pat. No. 4,342,793, (Skinner et al.), discloses compositions containing unsaturated monomers and polyurethane precursors wherein the unsaturated monomers are radiation-curable. Radiation-curing of polyurethane precursors is not taught. No pressure-sensitive adhesives are disclosed.

It is an object of the invention to provide a pressure-sensitive adhesive using a set of polyurethane precursors in combination with at least one free-radically polymerizable monomer and a photoinitiator system containing at least one salt of a cationic organometallic complex.

It is a further object to provide an adhesive having good mechanical properties using preferred polyurethane precursors in combination with preferred free-radically polymerizable monomers.

It is a further object of the invention to provide a pressure-sensitive adhesive having good mechanical properties using an acrylate homopolymer, i.e., without the necessity of the addition of polar copolymerizable monomers.

It is a further object of the invention to provide pressure-sensitive adhesives containing both photopolymerized polyurethane components, and photopolymerized acrylic components having superior mechanical properties to comparative conventional acrylate adhesives.

It is a further object of the invention to provide multiple photoinitiation processes which provide control over polymerization order, thereby providing increased control over properties of the desired composition.

It is a further object of the invention to provide a multiple photoinitiation process for making a pressure-sensitive adhesive comprising at least one free-radically polymerized monomer, and one set of polyurethane precursors having superior mechanical adhesive properties to those of an identical adhesive otherwise polymerized.

SUMMARY OF THE INVENTION

This invention provides a pressure-sensitive adhesive composition, and a method for producing same. The pressure-sensitive adhesive composition comprises the combination of at least one free-radically photopolymerizable monomer and at least one set of polyurethane precursors and a suitable photoinitiator system comprising at least one salt of a cationic organometallic complex and at least one additional free-radical initiator.

The invention further encompasses a method for producing a pressure-sensitive adhesive by photopolymerizing the polymerizable compositions of the invention via application of sufficient energy in the form of a combination of wavelengths of electromagnetic radiation such that photochemically reactive species both catalyze polyurethane formation and initiate free-radical polymerization. While the cationic organometallic complex will initiate both photopolymerizations, it is not an extremely efficient free-radical photoinitiator, and it is preferred to use a separate free-radical photoinitiator to initiate the free-radical reaction. Such irradiation may occur sequentially or simultaneously. The process provides essentially no volatile matter.

The present invention also encompasses pressure-sensitive adhesive tapes comprising one or more pressure-sensitive adhesive layers, produced from such photopolymerizable compositions. Such tapes may be transfer tapes, or tapes comprising a backing layer. Where desired, the tapes may be foam-like tapes, i.e., they may contain glass or polymeric microspheres, or gas voids, and may contain various modifying adjuvants.

Preferred pressure-sensitive adhesives of the invention comprise:

(a) at least one set of polyurethane precursors, (b) at least one acrylate or methacrylate ester monomer, (c) a salt of an organometallic complex cation, and (d) an additional free-radical photoinitiator.

Especially preferred pressure-sensitive adhesives of the invention comprise:

(a) at least one set of polyurethane precursors selected from the group consisting of aliphatic and aromatic diisocyanates and polyisocyanates in combination with diols and polyols, such that the ratio of isocyanate groups to hydroxyl groups is in the range of from about 1:2 to 2:1, preferably 1:1.25 to 1.25:1, b) at least one alkyl acrylate ester, c) at least one moderately polar monomer, d) at least one salt of an organometallic complex cation, and e) at least one free-radical photoinitiator The invention also provides a process for making pressure-sensitive adhesives comprising the steps of:

(a) providing a backing or substrate, (b) coating the substrate with an energy polymerizable composition of at least one alkyl acrylate ester, at least one set of polyurethane precursors, a salt of an organometallic complex cation, and an additional free-radical photoinitiator by methods such as bar, knife, reverse roll, extrusion die, knurled roll, or spin coatings, or by spraying, brushing, and the like, with or without a coating solvent, and (c) irradiating the resultant article with electromagnetic radiation to cause the polymerization of the coating.

The invention also provides a preferred process for making pressure-sensitive adhesives by multiple photoinitiation, comprising the steps of:

(a) providing a backing or substrate, (b) coating an energy polymerizable composition of at least one alkyl acrylate ester, at least one set of polyurethane precursors, a salt of an organometallic complex cation and an additional free-radical photoinitiator on the substrate by methods such as bar, knife, reverse roll, extrusion die, knurled roll, or spin coatings, or by spraying, brushing, and the like, with or without a coating solvent, and (c) irradiating the resultant article to cause the polymerization of the coating utilizing a technique called the "multiple photoinitiation process,"

wherein the composition is sequentially or simultaneously irradiated with light sources which provide electromagnetic radiation which stimulates one or more photochemically reactive species to initiate both the polyurethane and the free-radical photopolymerization.

When used herein, the following terms have these definitions.

1. The term "multiple photoinitiation process" means photoinitiation of polymerization by irradiating a polymerizable mixture with electromagnetic radiation which stimulates photochemically reactive species (initiators) to initiate, respectively, polyurethane and free-radical photopolymerizations.

2. The term "energy-induced curing" means curing by means of electromagnetic radiation (ultraviolet and visible) and thermal (infrared and heat) means or any combination thereof such as heat and light simultaneously, or in any sequence, e.g., heat followed by light, light followed by heat followed by light, and the like.

3. The term "free-radically polymerizable monomer" means at least one monomer that polymerizes by a fee-radical mechanism, including bireactive monomers, and includes, e.g., acrylates and methacrylates, vinyl esters, vinyl aromatic compounds, etc.

4. The term "polyurethane precursors" and "set of polyurethane precursor," means a polymerizable mixture of one or more monomers selected from diisocyanates and polyisocyanates, and one or more monomers bearing at least two isocyanate-reactive groups. The preferred isocyanate-reactive groups are hydroxyl groups The ratio of isocyanate groups to isocyanate-reactive groups is from 1:2 to 2:1.

5. The term "bireactive monomer" means a monomer that contains at least two free-radically polymerizable groups.

6. The term "bifunctional monomer" means those monomers which contain both at least one free-radically polymerizable group and at least one isocyanate or isocyanate-reactive group.

7. The term "catalytically-effective amount" means a quantity sufficient to effect polymerization of the curable composition to a polymerized product at least to a degree to cause an increase in the viscosity of the composition under the conditions specified.

8. The term "organometallic salt" means an ionic salt of an organometallic complex cation, wherein the cation contains at least one carbon atom of an organic group which is bonded to a metal atom of the transition metal series ("Basic Inorganic Chemistry", F. A. Cotton, G. Wilkinson, Wiley, 1976, p 497).

9. The term "transition metal series" means those metals in the Periodic Table Groups IVB, VB, VIB, VIIB, and VIII.

10. The term "photopolymerizable composition" as useful herein means a mixture where the ratio of free-radically polymerizable monomer to polyurethane precursors is 1:99 to 99:1.

11. The term "photoinitiator system" means a cationic organometallic complex photoinitiator or any combination of same with another photoinitiator, said system being capable of producing species which will initiate both polyurethane and free-radical polymerizations upon exposure to energizing radiation.

DETAILED DISCLOSURE OF THE INVENTION

The present invention provides pressure-sensitive adhesives, produced from an energy polymerizable composition comprising at least one free-radically photopolymerizable monomer, at least one set of polyurethane precursors and a photoinitiator system therefor, the photoinitiator system comprising at least one organometallic complex salt and at least one additional free-radical photoinitiator.

Free-radically polymerizable monomers can be selected from acrylate, methacrylate and vinyl ester functionalized materials. Of particular use are acrylate and methacrylate materials. They can be monomers and/or oligomers such as (meth)acrylates (meth)acrylamides, vinyl pyrrolidone and azlactones, as disclosed in U.S. Pat. No. 4,304,705, (Heilmann). Such monomers include mono-, di, or poly-acrylates and methacrylates such as methyl acrylate, methyl methacrylate, ethyl acrylate, isopropyl methacrylate, isooctyl acrylate, isobornyl acrylate, isobornyl methacrylate, acrylic acid, n-hexyl acrylate, stearyl acrylate, allyl acrylate, glycerol diacrylate, glycerol triacrylate, ethyleneglycol diacrylate, diethyleneglycol diacrylate, triethyleneglycol dimethacrylate, 1,6-hexanediol diacrylate, 1,3-propanediol diacrylate, 1,3-propanediol dimethacrylate, trimethyol propane triacrylate, 1,2,4-butanetriol trimethylacrylate, 1,4-cyclohexanediol diacrylate, pentaerythritol triacrylate, pentaerythritol tetraacrylate, pentaerythritol tetramethacrylate, sorbitol hexaacrylate, bis[1-(2-acryloxy)]-p-ethoxyphenyldimethylmethane, bis[1-(3-acryloxy-2-hydroxy)]-propoxyphenyl dimethylmethane, tris-hydroxyethyl isocyanurate trimethacrylate; the bis-acrylates and bis-methacrylates of polyethylene glycols of molecular weight 200–500, copolymerizable mixtures of acrylated monomers such as those of U.S. Pat. No. 4,652,274, and acrylated oligomers such as those of U.S. Pat. No. 4,642,126, both of which are incorporated herein by reference.

Preferable free-radically photopolymerizable monomers include alkyl acrylate monomers, preferably a monofunctional unsaturated acrylate ester of a non-tertiary alkyl alcohol, the alkyl groups of which have from about 4 to about 14 carbon atoms. Such monomers include, e.g., isooctyl acrylate, 2-ethyl hexyl acrylate, isononyl acrylate, decyl acrylate, dodecyl arcylate, butyl acrylate, and hexyl acrylate. The alkyl acrylate monomers may be polymerized into homopolymers or may be polymerized in the presence of one or more polar copolymerizable monomers.

When desired, polar copolymerizable monomers may be selected from strongly polar monomers such as acrylic acid, acrylamide, itaconic acid, or substituted acrylamides or moderately polar monomers such as N-vinyl-2-pyrrolidone, N-vinyl caprolactam, and acrylonitrile. Moderately polar monomers are preferred.

When strongly polar monomers are present, the acrylic polymers contain up to 2 parts of the strongly polar monomer per hundred parts photopolymerizable monomer mixture. When moderately polar monomers are present, the acrylic polymers contain up to about 50 parts, preferably up to about 30 parts of the moderately polar monomer.

Compositions of the invention may contain ratios of free-radically polymerizable monomers to polyurethane precursors of 99:1 to 1:99. The ratios are only useful insofar as they produce a pressure-sensitive adhesive; thus, not all polyurethane precursors are useful at all ratios. Preferred compositions contain ratios of from about 40:60 to about 95:5. Highly preferred compositions contain ratios of from about 70:30 to about 90:10. At these highly preferred ratios, preferred pressure-sensitive adhesives of this invention exhibit superior mechanical properties when compared to an acrylic homopolymer adhesive.

The polyurethane precursors useful in the present invention comprise an isocyanate component and an isocyanate-reactive component containing at least two isocyanate-reactive hydrogen atoms.

The polyisocyanate component of the polyurethane precursors may be any aliphatic, cycloaliphatic, araliphatic, aromatic or heterocyclic polyisocyanate, or any combination of such polyisocyanates.

Particularly suitable polyisocyanates correspond to the formula $$Q(NCO)_p \qquad \text{IV}$$

in which p is an integer from 2 to 4, and Q represents an aliphatic hydrocarbon di-, tri-, or tetra-radical containing from 2 to 100 carbon atoms, and zero to 50 heteroatoms, a cycloaliphatic hydrocarbon radical containing from 4 to 100 carbon atoms, and zero to 50 heteroatoms, an aromatic hydrocarbon radical or heterocyclic aromatic radical containing from 5 to 15 carbon atoms and zero to 10 heteroatoms, or an araliphatic hydrocarbon radical containing from 8 to 10 carbon atoms and zero to 50 heteroatoms. The heteroatoms that can be present in Q include non-peroxidic oxygen, sulfur non-amino nitrogen, halogen, silicon, and non-phosphino phosphorous.

Examples of such polyisocyanates include, but are not limited to: ethylene diisocyanate, 1,4-tetramethylene diisocyanate, 1,6-hexamethylene diisocyanate, trimethyl hexamethylene diisocyanate, 1,12-dodecane diisocyanate, cyclobutane-1,3-diisocyanate, 1-isocyanato-3,3,5-trimethyl-5-isocyanatomethylcyclohexane, 2,4-, and 2,6-hexahydro-1,3-phenylene diisocyanate and 2,4- and 2,6-hexahydro-1,4-phenylene diisocyanate, and mixtures of these isomers, perhydro-2,4'-, 4,4'-diphenylmethane diisocyanate and mixtures of these isomers, 1,3- and 1,4-phenylene diisocyanate, 2,4- and 2,6-tolylene diisocyanate and mixtures of these isomers, 2,4'- and 4,4'-diphenylmethane diisocyanate, and mixtures of these isomers, naphthalene-1,5-diisocyanate, and the reaction products of four equivalents of the above stated isocyanate-containing compounds with compounds containing two isocyanate-reactive groups.

It is also within the scope of the present invention to use, e.g., triphenylmethane-4,4'4"-triisocyanate, polyphenyl polymethylene polyisocyanates, as described in G.B. Nos. 874,430, and 848,671, both of which are incorporated herein by reference. Also useful are meta- and para-isocyanatophenylsulphonyl isocyanates, perchlorinated aryl polyisocyanates, polyisocyanates containing carbodiimide groups, norbornane diisocyanates, polyisocyanates containing allophanate groups, polyisocyanates containing isocyanurate groups, polyisocyanates containing urethane groups, polyisocyanates containing acrylated urea groups, polyisocyanates containing biuret groups, polyisocyanates produced by telomerization reactions of the type described in, inter alia, U.S. Pat. No. 3,654,106, polyisocyanates containing ester groups, polyisocyanates containing polymeric fatty acid groups, and reaction products of any of the above-mentioned diisocyanates with acetals according to German Patent No. 1,072,385, incorporated herein by reference, or mixtures of any of the above polyisocyanates.

Also useful are blocked polyisocyanates, which are commercially available, wherein the blocking group can be, e.g., phenol, epsilon-caprolactam, hydroxamic acid ester, ketoxime, t-butyl acetoacetate and others disclosed in "Progress in Organic Coatings", Elsevier Sequoia S. A., Lausanne, 1981, Volume 9, pp. 3–28.

Preferred polyisocyanates are aliphatic, such as hexamethylene diisocyanate, the isocyanurate and the biuret thereof, 4,4'-methylenebis(cyclohexylisocyanate); 1-isocyanato-3,3,5-trimethyl-5-isocyanatomethyl cyclohexane (isophorone diisocyanate) and the biuret thereof; the tolylene diisocyanates and the isocyanurates thereof; the mixed isocyanurate of tolylene diisocyanate and hexamethylene diisocyanate; the reaction product of one mole of trimethylol propane and 3 moles of tolylene diisocyanate and crude diphenylmethane diisocyanate.

Suitable polyols contain at least two isocyanate-reactive hydrogen atoms. Polyols can be high or low molecular weight compounds, having a weight average molecular weight of from abut 50 to 50,000. Useful compounds are those including amino groups, thiol groups, carboxyl groups, and hydroxyl groups. Preferred compounds are those containing hydroxyl groups, and having a weight average molecular weight of from about 50 to about 20,000. Examples include polyesters, polyethers, polythioethers, polyacetals, polycarbonates, poly(meth)acrylates, and polyester imides containing from about 2 to about 8, preferably from about 2 to about 4 hydroxyl groups, or even hydroxy-containing prepolymers of these compounds, and a more than equivalent quantity of polyisocyanate.

Examples of the isocyanate-reactive compounds include pentaerythritol, 1,2-propanediol, ethylene glycol, and glycerol.

Preferably, compounds containing hydroxyl groups, particularly compounds containing from about 2 to 50 hydroxyl groups and above all, compounds having a weight average molecular weight of from about 500 to 20,000, for example, polyesters, polyethers, polythioethers, polyacetals, polycarbonates, poly(meth)acrylates, and polyester amides, containing at least 2, generally from about 2 to 8, but preferably from about 2 to 4 hydroxyl groups, or even hydroxyl-containing prepolymers of these compounds. Representatives of the above-mentioned compounds used in accordance with the present invention are described, for example, in High Polymers, Vol. XVI, "Polyurethanes, Chemistry and Technology", By Saunders and Frisch, Interscience, and Vol. I, 1962, pages 32 to 42 and pages 44 to 54 and Vol. II, 1964, pages 56 and 198–199, and in "Kunststoff-Handbuch", Vol. VII, Vieweg-Hochtlen, Carl-Hanser Verlag, 1966, for example, on pages 45 to 71. It is, of course, possible to use mixtures of the above-mentioned compounds containing at least two hydroxyl groups and having a molecular weight of from about 50 to 50,000 for example, mixtures of polyethers and polyesters. In some cases, it is particularly advantageous to combine low-melting and high-melting polyhydroxyl containing compounds with one another (German Offenlegungsschrift No. 2,706,297).

Low molecular weight compounds containing at least two reactive hydroxyl groups (molecular weight from about 50 to 400) suitable for use in accordance the present invention are compounds preferably containing hydroxyl groups and generally containing from about 2 to 8, preferably from about 2 to 4 reactive hydroxyl groups.

It is also possible to use mixtures of different compounds containing at least two hydroxyl groups and having a molecular weight in the range of from about 50 to 400. Examples of such compounds are ethylene glycol, 1,2- and 1,3-propylene glycol, 1,4- and 2,3-butylene glycol, 1,5-pentane diol, 1,6-hexane diol, 1,8-octane diol, neopentyl glycol, 1,4-bis(hydroxymethyl)cyclohexane, 2-methyl-1,3-propane diol, dibromobutene diol, glycerol, trimethylolpropane, 1,2,6-hexanetriol, trimethylolethane, pentaerythritol, quinitol, mannitol, sorbitol, diethylene glycol, triethylene glycol, tetraethylene glycol, higher polyethylene glycols, dipropylene glycol, higher molecular weight polypropylene glycols, dibutylene glycol, higher molecular weight polybutylene glycols, 4,4'-dihydroxy diphenyl propane and dihydroxy methyl hydroquinone.

Other polyols suitable for the purposes of the present invention are mixtures of hydroxy aldehydes and hydroxy ketones ("formose") or the polyhydric alcohols obtained therefrom by reduction ("formitol") which are formed in the autocondensation of formaldehyde, polymers thereof and hydrates thereof, in the presence of metal compounds as catalysts and compounds capable of enediol formation as co-catalysts (German Offenlegungsschrift Nos. 2,639,084; 2,714,084; 2,714,104; 2,721,186; 2,738,154; and 2,738,512).

Useful polyfunctional alcohols include poly(ethylene glycol), and poly(propylene glycol).

Other useful isocyanate-reactive compounds are disclosed in *High Polymers*, Vol. XVI, "Polyurethanes, Chemistry and Technology" by Saunders and Frisch, Interscience Publishers, New York/London, and *Kunstroff-Handuch*, Vol I, pgs, 45–71, Vieweg-Hochtlen, Carl- Hanser Verlag, Munich, 1966.

Preferred isocyanate-reactive compounds are polyols having molecular weights in the range from 200 to 2,000 grams per mole, and containing two or more primary hydroxyl groups per molecule. The preferred polyols can be divided into four groups. The first three groups consist of commercially available polyols. These include polyether polyols, polyesterpolyols, and acrylic polyols. Preferred polyester polyols include Desmophen™ 670-80; Desomophen™ 670-100, Desmophen™ 800, and 1100, all available from Mobay Corporation. Also preferred are certain polyester polyols available from Union Carbide Corp. under the trademark "Tone™", i.e., Tone™ 200, 210, 230, 240, 260, 301, 305, and 310.

Preferred polyether diols include certain diols available under the trademark "Carbowax™" from Union Carbide Corp such as Carbowax™ 400, 600, 800, 1000, 3350, 8000, and 20,000. Also preferred are diols, available by the trademark "Terathane", e.g. Terathane™ 2900 and Terathane™ 2000 available from E. I. du Pont de Nemours and Co. (DuPont).

A preferred acrylic polyol is Joncryl™ 587, available from S. C. Johnson & Son, Inc., and such as alkyl and cycloalkyl polyols, e.g., 2,5-hexanediol, 1,6 hexanediol, ethylene glycol, Dimerol™, a 36 carbon essentially linear diol available from General Mills Chemicals, Inc., glycerol, 1,2,6-hexanetriol, pentaerythritol, and 1,4-cyclohexane diol.

The fourth group consists of hydroxy alkylated bisphenol derivatives. Preferred diols in this group have the following structure:

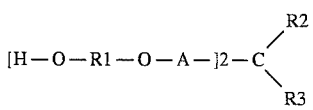

where $R_1$ is either a straight or branched or cyclic alkyl group consisting of 1 to 10 carbon atoms or an aralkyl group consisting of 7 to 14 carbon atoms. $R_2$ and $R_3$ may be independently alkyl, aralkyl, cycloalkyl, alkaryl, or an aryl group of 1 to 30 carbon atoms and none or 1 to 10 heteroatoms, and $R_2$ and $R_3$ together comprise an alkylene, cycloalkylene, arylene, alkarylene, aralkylene or cycloaralkylene group containing 2 to 660 carbon atoms, and none or 1 to 10 heteroatoms. A is a substituted or unsubstituted arylene.

Specific preferred hydroxy alkylated bispenols are 9,9-bis(4-(2-hydroxyethoxy)phenyl)fluorene(hydroxethylated bisphenol of fluorenone), 2,2-bis(4-(2-hydroxyethoxy)phenyl)propane(hydroxyethoxy-bisphenol of acetone), 2,2-bis(4-(2-hydroxyethoxy)phenyl)hexafluoropropane(hydroxyethylated bisphenol F), 2,2-bis(4-(2-hydroxyethoxy)phenyl)propane, 2,2-bis(4-(2-hydroxyethoxy)phenyl)norbornane, 2,2-bis(4-(2-hydroxyethoxy)phenyl)-5,6-cyclopenta-norbornane, 1,1-bis-4-(2-hydroxyethoxyphenyl)cyclohexane.

Another group of monomers which are useful in compositions of the invention are bifunctional monomers, i.e., those that possess at least one free-radically polymerizable functionality and at least one isocyanate or isocyanate-reactive functionality. Such monomers include 2-isocyanatoethyl methacrylate, 3-isopropen4lphenyl isocyante, 2-hydroxyethyl acrylate, hydroxyethyl methacrylates, hydroxypropyl methacrylates and hydroxybutyl acrylate and mixtures thereof.

The organometallic complex salt can have the structure:

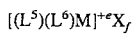     I.

wherein M represents a metal atom selected from the elements of Periodic Groups IVB, VB, VIB, VIIB, and VIII, with the proviso that formula I represents an organometallic salt having a mono- or bimetallic cation;

$L^1$ represents none, 1, 2, or 3 ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of contributing two to twelve pi-electrons to the valence shell of M;

$L^2$ represents none, or 1 to 6 ligands contributing an even number of sigma-electrons that can be the same or different selected from mono-, di-, and tri-dentate ligands, each donating 2, 4, or 6 sigma-electrons to the valence shell of M;

$L^3$ represents none, 1 or 2 bridging ligands contributing pi-electrons that can be the same or different ligand selected from substituted and unsubstituted acyclic and cyclic unsaturated compounds and groups and substituted and unsubstituted carbocyclic aromatic and heterocyclic aromatic compounds, each capable of acting as a bridging ligand contributing 4 to 24 pi-electrons to the valence shells of two metal atoms M, simultaneously;

$L^4$ represents none, 1, 2, or 3 bridging ligands contributing an even number of sigma-electrons that can be the same or different selected from mono-, di-, and tri-dentate ligands, each donating 2, 4 or 6 sigma-electrons to the valence shells of two metal atoms M, simultaneously; with the proviso that the total electronic charge contributed to M by the ligands $L^1$, $L^2$, $L^3$, and $L^4$ plus the product of the ionic charge on M with b results in a residual positive charge of e to the cation;

b is an integer having a value of 1 or 2;

e is an integer having a value of 1 or 2, the residual electrical charge of the cation;

X is an anion selected from organic sulfonate anions and halogen-containing complex anions of a metal or metalloid;

f is an integer having a value of 1 or 2, the number of anions required to neutralize the positive charge e on the cation.

In a preferred composition of the invention, the salts of the organometallic complex cation have the formula:

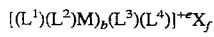     II.

wherein

M represents a metal atom selected from elements of the Period Groups IVB, VB, VIB, VIIB, and VIII;

$L^5$ represents none, one or two ligands that can be the same or different, contributing pi-electrons selected from the same groups of ligands from which ligand L1 of formula I is selected;

$L^6$ represents none or 1 to 6 ligands that can be the same or different, contributing an even number of sigma-electrons selected from the same group of ligands from which ligand $L^2$ of formula I is selected; with the proviso that the total electronic charge contributed to M by $L^5$ and $L^6$ plus the ionic charge on M results in a residual net positive charge of e to the complex; and e, f, and X have the same definition as given in formula I. In highly preferred photoinitiator systems, $L^6$ represents no ligands and M is iron.

Ligands $L^1$ to $L^6$ are well known in the art of transition metal organometallic compounds.

Ligand $L^1$ and $L^3$ of general formula I and ligand $L^5$ of general formula II are provided by any monomeric or polymeric compound having an accessible unsaturated group, i.e., an ethylenic, —C=C— group; acetylenic, —C≡C— group or aromatic group which have accessible pi-electrons regardless of the total molecular weight of the compound. By "accessible", it is meant that the compound (or precursor compound from which the accessible compound is prepared) bearing the unsaturated group is soluble in a reaction medium, such as an alcohol, e.g., methanol; a ketone, e.g., methyl ethyl ketone; an ester, e.g., amyl acetate; a halocarbon, e.g., trichloroethylene; an alkylene, e.g., decalin; an aromatic hydrocarbon, e.g., anisole; an ether, e.g., tetrahydrofuran; etc. or that the compound is divisible into very fine particles of high surface area so that the unsaturated group (including aromatic group) is sufficiently close to a metal atom to form a pi-bond between that unsaturated group and the metal atom. By polymeric compound, is meant, as explained below, that the ligand can be a group on a polymeric chain.

Illustrative of ligands $L^1$, $L^3$ and $L^5$ are the linear and cyclic olefinic and acetylenic compounds having less than 100 carbon atoms, preferably having less than 60 carbon atoms, and from zero to 10 hetero atoms selected from nitrogen, sulfur, non-perioxidic oxygen, arsenic, phosphorus, selenium, boron, antimony, tellurium, silicon, germanium, and tin, such as, for example, ethylene, acetylene, propylene, methylacetylene, 1-butene, 2-butene, diacetylene, butadiene, 1,2-dimethylacetylene, cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; $eta^3$-allyl, $eta^3$-pentenyl, norbornadiene, $eta^5$-cyclohexadienyl, $eta^6$-cycloheptatriene, $eta^8$-cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, antimony, tellurium, silicon, germanium, and tin, such as, for example, $eta^5$-cyclohexadienyl, $eta^6$-benzene, $eta^6$-mesitylene, $eta^6$-toluene, $eta^6$-p-xylene, $eta^6$-o-xylene, $eta^6$-m-xylene, $eta^6$-cumene, $eta^6$-hexamethylbenzene, $eta^6$-fluorene, $eta^6$-naphthalene, $eta^6$-anthracene, $eta^6$-perylene, $eta^6$-chrysene, $eta^6$-pyrene, $eta^7$-cycloheptatrienyl, $eta^6$-triphenylmethane, $eta^{12}$-paracyclophane, $eta^{12}$-1,4-diphenylbutane, $eta^5$-pyrrole, $eta^5$-thiopene, $eta^5$-furan, $eta^6$-pyridine, $eta^6$-gamma-picoline, $eta^6$-quinaldine, $eta^6$-benzopyran, $eta^6$-thiochrome, $eta^6$-benzoxazine, $eta^6$-indole, $eta^6$-acridine, $eta^6$-carbazole, $eta^6$-triphenylene, $eta^6$-silabenzene, $eta^6$-arsabenzene, $eta^6$-stibabenzene, $eta^6$-2,4,6-triphenylphosphabenzene, $eta^5$-selenophene, $eta^6$-dibenzostannepine, $eta^5$-tellurophene, $eta^6$-phenothiarsine, $eta^6$-selenanthrene, $eta^6$-phenoxaphosphine, $eta^6$-phenarsazine, $eta^6$-phenatellurazine, and $eta^6$-1-phenylborabenzene. Other suitable aromatic compounds can be found by consulting any of many chemical handbooks.

As mentioned before, the ligand can be a unit of a polymer, for example, the phenyl group in polystyrene, poly(styrene-co-butadiene), poly(styrene-co-methyl methacrylate), poly(alpha-methylstyrene), polyvinylcarbazole, and polymethylphenylsiloxane; the cyclopentadiene group in poly(vinylcyclopentadiene); the pyridine group in poly(vinylpyridine), etc. Polymers having a weight average molecular weight up to 1,000,000 or more can be used. It is preferable that 5 to 50 percent of the unsaturated or aromatic groups present in the polymer be complexed with metallic cations.

Each of ligands $L^1$, $L^3$ and $L^5$ can be substituted by groups that do not interfere with complexing of the ligand with the metal atom or groups which do not reduce solubility of the ligand to the extent that complexing with the metal atom does not take place. Examples of substituting groups, all of which preferably have less than 30 carbon atoms and up to 10 hetero atoms selected from nitrogen, sulfur, non-peroxidic oxygen, phosphorus, arsenic, selenium, antimony, tellurium, silicon, germanium, tin, and boron, include hydrocarbyl groups such as methyl, ethyl, butyl, dodecyl, tetracosanyl, phenyl, benzyl, allyl, benzylidene, ethenyl, and ethynyl; hydrocarbyloxy groups such as methoxy, butoxy, and phenoxy; hydrocarbylmercapto groups such as methylmercapto(thiomethoxy), phenylmercapto(thiophenoxy); hydrocarbyloxycarbonyl such as methoxycarbonyl and phenoxycarbonyl; hydrocarbylcarbonyl such as formyl, acetyl, and benzoyl; hydrocarbylcarbonyloxy such as acetoxy, and cyclohexanecarbonyloxy; hydrocarbylcarbonamido, e.g., acetamido, benzamido; azo, boryl; halo, e.g., chloro, iodo, bromo, and fluoro; hydroxy; cyano; nitro; nitroso; oxo; dimethylamino; diphenylphosphino, diphenylarsino; diphenylstibine; trimethylgermane; tributyltin; methylseleno; ethyltelluro; and trimethylsiloxy; condensed rings such as benzo, cyclopenta; naphtho, indeno; and the like.

Ligands $L^2$ and $L^4$ in formula I, and $L^6$ in formula II are provided by monodentate and polydentate compounds preferably containing up to about 30 carbon atoms and up to 10 hetero atoms selected from nitrogen, sulfur, non peroxidic oxygen, phosphorus, arsenic, selenium, antimony, and tellurium, upon addition to the metal atom, following loss of zero, one, or two hydrogens, the polydentate compounds preferably forming with the metal, M, a 4-, 5-, or 6-membered saturated or unsaturated ring. Examples of suitable monodentate compounds or groups are carbon monoxide, carbon sulfide, carbon selenide, carbon telluride, alcohols such as ethanol, butanol, and phenol; nitrosonium (i.e., $NO^+$); compounds of Group VA elements such as ammonia, phosphine, trimethylamine, trimethylphosphine, triphenylamine, triphenylphosphine, tributylphosphite, isonitriles such as phenylisonitrile, butylisonitrile; carbene groups such as ethoxymethylcarbene, dithiomethoxycarbene; alkylidenes, such as methylidene, ethylidene; suitable polydentate compounds or groups include 1,2-bis(diphenyl-phosphino)ethane, 1,2-bis(diphenylarsino)ethane, bis(diphenylphosphino)methane, ethylenediamine, propylenediamine, diethylenetriamine, 1,3-diisocyanopropane, and hydridotripyrrazolyborate; the hydroxycarboxylic acids such as glycolic acid, lactic acid, salicyclic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamines as oxalamide, biuret; diketones such as 2,4-pentanedione; hydroxyketones such as 2-hydroxyacetophenone; alpha-hydroxyoximes such as salicylaldoxime; ketoximes such as benzil oxime; and glyoximes such as dimethylglyoxime. Other suitable groups are the inorganic groups or atoms such as, for example, $CN^-$, $SCN^-$, $F^-$, $OH^-$, $Cl^-$, $Br^-$, $I^-$, and $H^-$ and the organic groups such as, for example, acetoxy, formyloxy, benzoyloxy, etc. As mentioned before, the ligand can be a unit of a polymer, for example the amino group in poly(ethyleneamine); the phosphino group in poly(4-vinylphenyldiphenylphosphine); the carboxylic acid group in poly(acrylic acid); and the isonitrile group in poly(4-vinylphenylisonitrile).

M can be any element from the Periodic Groups IVB, VB, VIB, VIIB, and VIII, such as, for example, Ti, Zr, Hf, V, Nb, Ta, Cr, Mo, W, Mn, Tc, Re, Fe, Ru, Os, Co, Rh, Ir, Ni, Pd and Pt. In the preferred compositions, M is Co, Fe, Mn, Re, Mo or Cr. In the most preferred compositions, M is Fe.

Suitable anions, X, in formulas I and II, of use as the counterion in the ionic salts of the organometallic complex cation in the preferred radiation-sensitive compositions of the invention are those in which X has the formula $DZ_r$, wherein D is a metal from Groups IB to VIII or a metal or metalloid from Groups, IIIA to VA of the Periodic Chart of Elements, Z is a halogen atom, a hydroxy group, a substituted phenyl group or an alkyl group and r is an integer having a value of 1 to 6. Preferably, the metals are copper, zinc, titanium, vanadium, chromium, manganese, iron, cobalt, or nickel and the metalloids preferably are boron, aluminum, antimony, tin, arsenic, and phosphorus. Preferably, the halogen, Z, of X in formula II, is chlorine or fluorine. Illustrative of suitable anions are $B(phenyl)_4^-$, $B(phenyl)_3(alkyl)^-$, where alkyl can be ethyl, propyl, butyl, hexyl and the like, $BF_4^-$, $PF_6^-$, $AsF_6^-$, $SbF_6^-$, $FeCl_4^-$, $SnCl_5^-$, $SbF_5^-$, $AlF_6^-$, $GaCl_4^-$, $InF_4^-$, $TiF_6^-$, $ZrF_6^-$, etc. Preferably, the anions are $BF_4^-$, $PF_6^-$, $SbF_6^-$, $SbF_5OH^-$, $AsF_6^-$, and $SbCl_6^-$.

Additional suitable anions, X, in formulae I and II, of use as the counterion in the ionic salts of the organometallic complex cations include those in which X is an organic sulfonate. Illustrative of suitable sulfonate-containing anions are $CH_3SO_3^-$, $CF_3SO_3^-$, $C_6H_5SO_3^-$, p-toluenesulfonate, p-chlorobenzenesulfonate and related isomers and the like.

Organometallic salts are known in the art and can be prepared as disclsoed in, for example, EPO Nos. 109,851, 094,914, 094,915 and 126,712, which are incorporated herein by reference. In addition to the compounds of formulae I and II, all of the organometallic salts disclosed in these references are useful in the present invention.

The preferred salts of organometallic complex cations useful in the compositions of the invention are derived from formula II where $L^5$ is taken from the class of substituted and unsubstituted aromatic compounds based on a benzene or cyclopentadienyl nucleus, $L^6$ is none, M is Fe, e is 1 or 2 and $X_f$ is tetrafluoroborate, hexafluorophosphate, hexafluoroarsenate or hexafluoroantimonate.

Examples of preferred salts of organometallic complex cations useful in the composition of the invention include the following:

(eta$^6$-benzene)(eta$^5$-cyclopentadienyl)iron(1+)hexafluorophosphate
(eta$^6$-toluene)(eta$^5$-cyclopentadienyl)iron(1+)hexafluoroantimonate
(eta$^6$-cumene)(eta$^5$-cyclopentadienyl)iron(1+)hexafluorophosphate
(eta$^6$-p-xylene)(eta$^5$-cyclopentadienyl)iron(1+)hexafluorophosphate
(eta$^6$-o-xylene)(eta$^5$-cyclopentadienyl)iron(1+)hexafluorophosphate
(eta$^6$-o-xylene)(eta$^5$-cyclopentadienyl)iron(1+)hexafluorophosphate
(eta$^6$-mesitylene)(eta$^5$-cyclopentadienyl)iron(1+)hexafluoroantimonate
(eta$^6$-hexamethylbenzene)(eta$^5$-cyclopentadienyl)iron(1+)hexafluoroantimonate
(eta$^6$-naphthalene)(eta$^5$-cyclopentadienyl)iron(1+)hexafluoroantimonate
(eta$^6$-pyrene(eta$^5$-cyclopentadienyl)iron(1+)hexafluorophosphate
(eta$^6$-perylene)(eta$^5$-cyclopentadienyl)iron(1+)hexafluoroantimonate
(eta$^6$-chrysene)(eta$^5$-cyclopentadienyl)iron(1+)hexafluorophosphate
(eta$^6$-acetophenone)(eta$^5$-methylcyclopentadienyl)iron(1+)hexafluoroantimonate
(eta$^6$-fluorene)(eta$^5$-cyclopentadienyl)iron(1+)hexafluoroantimonate
bis(eta$^6$-mesitylene)iron(2+)hexafluoroantimonate.

It is believed that the cationic organometallic complex salts form photochemically reactive species capable of both catalyzing the polyurethane formation and initiating free-radical polymerizations. Thus, the photoinitiator system may comprise only a single organometallic complex cation salt. However, the oragnometallic complex is not efficient in its initiation of the free-radical polymerization, especially when the free-radical monomers are combined with the polyurethane precursors.

The additional free-radical initiator can be selected from those compounds that generate free-radicals upon exposure to heat or radiation, e.g., those compounds disclosed in "Mechanisms of the Photodecomposition of Initiators", George F. Vesley, *Journal of Radiation Curing*™, January, 1986, incorporated herein by reference. They are selected from acetophenones and ketals, benzophenones, aryl glyoxylates, acylphosphine oxides, sulfonium and iodonium salts, diazonium salts and peroxides. Preferred additional free-radical initiators that are light activated are those that have an absorption maximum in the 300 to 400 nm region of the electromagnetic spectrum.

Especially useful are acetophenones and ketals corresponding to the formula:

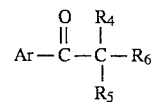

$$Ar-\overset{O}{\underset{}{C}}-\overset{R_4}{\underset{R_5}{C}}-R_6 \qquad III$$

wherein Ar is $C_6$–$C_{14}$ aryl which is unsubstituted or substituted by halogen, CN, OH, $C_1$–$C_{12}$ alkyl, -alkoxy, -phenoxy, -thioalkyl, —$SCH_2CH_2OH$, -thiophenyl, —$SO_2$alkyl, —$SO_2$phenyl, —COOalkyl, —$SO_2NH_2$, —$SO_2$N-Halkyl, —$SO_2N(alkyl)_2$, —NHalkyl, —$N(alkyl)_2$, —NHCOalkyl or —NHCO-phenyl, or represents thienyl, pyridyl, furyl, indanyl or tetrahydronaphthyl, and alkyl represents a lower alkyl radical of 1 to 4 carbon atoms; $R_4$ is OH, $C_1$–$C_8$ alkyl which is unsubstituted or substituted by —OH, alkoxy, $C_2$–$C_8$ acyloxy, —COOalkyl or CN, or is $C_3$–$C_4$ alkylenyl, $C_5$–$C_6$ cycloalkyl, $C_7$–$C_9$ phenylalkyl, or —$OR_7$ wherein $R_7$ is $C_1$–$C_8$ alkyl which is unsubstituted or substituted by —OH, alkoxy, $C_2$–$C_8$ acyloxy, —COO alkyl, —CN or phenyl, or $C_6$ aryl; and $R_5$ has one of the meanings assigned to $R_3$, $C_2$–$C_8$ alkylenylene or together with $R_3$ represents $C_2$–$C_8$ alkylene or $C_3$–$C_9$ oxaalkylene or azaalkylene; and $R_6$ is hydrogen, OH, $C_1$–$C_8$ alkyl, $C_6$–$C_{14}$ aryl, $C_5$–$C_8$ cycloalkyl or morpholino.

Such compounds have been disclosed, for example, in U.S. Pat. Nos. 3,715,293, 3,728,377, 4,284,485 and 4,318,791, all of which are incorporated herein by reference.

Preferred compounds have $R_4$ and $R_5$ as —$OR_7$, $R_7$ as $C_1$–$C_4$ alkyl and $R_6$ phenyl; or $R_4$ and $R_5$ combining to form $C_2$–$C_8$ alkylene, preferably cyclohexylene, and $R_6$ as —OH or phenyl.

Typical alkyl groups include methyl, ethyl, propyl, isobutyl, t-butyl, pentyl, neopentyl, hexyl, heptyl, octyl, 2-ethylhexyl; aryl groups include phenyl, naphthyl, anthracyl, tolyl, xylyl, methoxyphenyl, halophenyl, hydroxyphenyl, nitrophenyl and carboethoxyphenyl; and cycloalkyl groups include cyclopentyl, methylcyclopentyl, dimethylcyclopentyl, ethylcyclopentyl, cyclohexyl, methylcyclohexyl, cycloheptyl, bicycloheptyl, cyclooctyl, and bicyclooctyl.

Illustrative thereof are
2,2-dimethoxyacetophenone
2,2-dimethoxy-2-phenylacetophenone
2,2-diethoxyacetophenone
2,2-dibutoxyacetophenone
2,2-dihexuloxyacetophenone
2,2-di(2-ethylhexyl)acetophenone
2,2-diphenoxyacetophenone
2,2-ditolyloxyacetophenone
2,2-di(chlorophenyl)acetophenone
2,2-di(nitrophenyl)acetophenone
2,2-diphenoxy-2-phenylacetophenone
2,2-dimethoxy-2-methylacetophenone
2,2-dipropoxy-2-hexylacetophenone
2,2-diphenoxy-2-ethylacetophenone
2,2-dimethoxy-2-cyclopentylacetophenone
2,2-di(2-ethylhexyl)-2-cyclopentylacetophenone
2,2-diphenoxy-2-cyclopentyl-acetophenone
2,2-di(nitrophenoxy)-2-cyclohexylacetophenone 2,2-dimethyl-2-hydroxyacetophenone
2,2-diethoxy-2-phenylacetopenone
2,2-diphenethyloxy-2-phenylacetophenone
2,2-(2-butenediyloxy)-2-phenylacetophenone
2,2-dimethyl-2-morpholino-(p-thiomethyl)acetophenone
1-hydroxycyclohexyl phenyl ketone.

Also preferred are aromatic onium salts. These salts are disclosed, for example in U.S. Pat. Nos. 4,069,054, 4,231,951 and 4,250,203. Such salts are described by the formula

AX   IV wherein A is an organic cation selected from those described in U.S. Pat. Nos. 3,708,296, 3,729,313, 3,741,769, 3,794,576, 3,808,006, 4,026,705, 4,058,401, 4,069,055, 4,101,513, 4,216,288, 4,394,403, and 4,623,676, all of which are incorporated herein by reference. A is preferably selected from diazonium, iodonium, and sulfonium cations, more preferably diphenyliodonium, triphenylsulfonium and phenylthiophenyl diphenylsulfonium. X is an anion where X is the same as defined for formulas I and II. Preferably, the anions are $CF_3SO_3^-$, $BF_4^-$, $PF_6^-$, $SbF_6^-$, $SbF_5OH^-$, $AsF_6^-$ and $SbCl_6^-$.

Photoinitiators which are useful for partially polymerizing alkyl acrylate monomer without crosslinking, to prepare the partially polymerized syrup, discussed infra, include the benzoin ethers (such as benzoin methyl ether or benzoin isopropyl ether), substituted benzoin ethers (such as anisoin methyl ether), substituted acetophenones (such as 2,2-diethoxyacetophenone and 2,2-dimethoxy-2-phenylacetophenone), substituted alpha-ketols (such as 2-methyl-2-hydroxypropiophenone), aromatic sulfonyl chlorides (such as 2-naphthalenesulfonyl chloride) and photoactive oximes. Photoinitiators may be used for syrup-making in amounts which, when dissolved, provide about 0.001 to 0.5 percent by weight of the alkyl acrylate monomer, preferably at least 0.01 percent.

Where concurrent photoinitiation and crosslinking is desirable, the specific photoactive chromophore-substituted-halomethyl-s-triazines disclosed in U.S. Pat. Nos. 4,391,687 (Vesley) and 4,330,590, (Vesley) and 4,329,384 (Vesley et al.) are also useful as photoinitiators. The preferred level of triazine taught ranges from 0.01 to about 2 parts of the crosslinking agent per 100 parts acrylic copolymer.

A suitable photoinitiator system which includes organometallic complex ionic salts described by formulae I or II, and the additional free-radical initiator contains those combinations that, upon application of sufficient energy, thermal, accelerated particle (electron beam), or electromagnetic radiation (having a wavelength from about 200 to 800 nm), will catalyze the polymerization of compositions of the invention. The level of catalytic activity depends on various factors such as the choice of metal, ligands, and counterions in the organometallic salt and the selection of the additional free-radical photoinitiator, if any.

In general, the photoinitiator system should be present in a catalytically effective amount. Typically, the photoinitiator system can be present in the range of 0.01 to 20, preferably 0.02 to 5 weight percent of the total polymerizable composition. The ratio of the organometallic complex salt to the additional free-radical initiator, is generally in the range of 1:100 100:1. Preferably, the ratio is in the range of 10:1 1:10.

Energy polymerizable compositions of this invention are radiation-sensitive in addition to being thermally sensitive, i.e., they can be polymerized in a two stage polymerization process using radiation followed by heat. Heat can also be applied before or during the irradiation process to promote polymerization of the composition.

When desired, photosensitizers or photoaccelerators may be incorporated into the photopolymerizable compositions. Use of photosensitizers or photoaccelerators alters the wavelength sensitivity of radiation-sensitive compositions employing the latent catalysts of this invention. This is particularly advantageous when the latent catalyst does not strongly absorb incident radiation. Use of a photosensitizer or photoaccelerator increases the radiation sensitivity, allowing shorter exposure times and/or use of less powerful sources of radiation. Any photosensitizer or photoaccelerator may be useful if its triplet energy is at least 45 kilocalories per mole. Examples of such photosensitizers are given in Table 2-1 of Steven L. Murov, "Handbook of Photochemistry," Marcel Dekker Inc., 27–35 (1973), and include pyrene, fluoranthrene, xanthone, thioxanthone, benzophenone, acetophenone, benzil, benzoin and ethers of benzoin, chrysene, p-terphenyl, acenaphthene, naphthalene, phenanthrene, biphenyl, substituted derivatives of the preceding compounds, and the like. When present, the amount of photosensitizer or photoaccelerator used in the practice of the present invention is generally in the range of 0.01 to 10 parts, and preferably 0.1 to 1.0 part, by weight, of photosensitizer or photoaccelerator per part of organometallic salt.

Long wavelength sensitizers may be added, i.e., dyes. Suitable sensitizers are believed to include compounds in the following categories of dyes: ketones, aminoketones, coumarin (e.g. ketocoumarins), xanthenes, acridines, thiazoles, thiazines, oxazines, azines, porphyrins, aromatic polycyclic hydrocarbons, aminotriaryl methanes, merocyanines, squarylium and pyridinium.

While not being bound by theory, it is believed that the compositions comprising preferred ratios of free-radically polymerizable monomer(s), polyurethane precursors, and photoinitiator system allows the formation of a multiphase material with high levels of mixing of the two polymers. Some systems will form a semi-interpenetrating polymer network (semi-IPN); some systems a true IPN. The existence of the multiphase structure provides good tensile strength even where a polar comonomer such as acrylic acid, itaconic acid of acrylamide is not used. Additionally, this invention provides a means to impart high tensile strength without substantially sacrificing the properties of elongation and peel strength which are important to adhesive performance.

Pressure-sensitive adhesives of the invention may be foam-like adhesives, i.e., a monomer blend comprising microspheres may be used. The microspheres may be glass or polymeric. The microspheres should have an average diameter of 10 to 200 micrometers, and comprise from about 5 to about 65 volume percent of the core layer. Thickness of foam-like layers in preferred tapes of the invention range from 0.3 mm to about 4.0 mm in thickness.

Preferred glass microspheres have average diameters of about 80 micrometers. When glass microspheres are used, the removable pressure-sensitive adhesive layer should be at least 3 times as thick as their diameter, preferably at least 7 times. Thickness of layers containing such glass microspheres should be at least six times, preferably at least twenty times that of each microsphere-free layer.

Useful glass microspheres include colored microspheres such as those disclosed in U.S. Pat. Nos. 4,612,242, (Vesley et al.), 4,618,242, (Chamberlain et al.), 4,666,771, (Vesley et al.), and 4,950,537 (Vesley et al.) all of which are incorporated herein by reference.

Also useful are polymeric microspheres, such as those described in U.S. Pat. Nos. 4,855,170 (Darvell et al.), 3,615,972 (Moon), 4,075,238 (Mark), and 4,287,308 (Nakayama), all of which are incorporated herein by reference. The microspheres are available from Kema Nord Plastics under the tradename "Expancel" and from Matsumoto Yushi Seiyaku under the trade name "Micropearl". In expanded form, the microspheres have a specific density of approximately 0.02–0.036 g/cc.

Other useful materials which can be blended into compositions of the invention include, but are not limited to, adjuvants such as fillers, pigments, fibers, woven and non-woven fabrics, foaming agents, antioxidants, stabilizers, fire retardants, free-radical inhibitors, and viscosity adjusting agents.

One useful filler material is hydrophobic silica as disclosed in U.S. Pat. Nos. 4,710,536 and 4,749,590, (Klingen et al.) both of which are incorporated herein by reference. In one preferred embodiment of the present invention, the pressure-sensitive adhesive composition further comprises from about 2 to about 15 parts of a hydrophobic silica having a surface area of at least 10 $m^2/g$.

The present invention also provides a process for preparing pressure-sensitive adhesives comprising the steps of:

(a) providing a backing or substrate, (b) coating an energy polymerizable mixture as described above to the substrate by methods know in the art; such as bar, knife, reverse roll, knurled roll, or spin coatings, or by spraying, brushing, and the like, with or without a coating solvent, and (c) irradiating the resultant article to cause polymerization of the coating utilizing a technique called the "multiple photoinitiation process," wherein the mixture is sequentially or simultaneously irradiated with light sources which provide electromagnetic radiation which stimulates photochemically reactive species to initiate both the polyurethane and free-radical photopolymerizations.

It is not preferred, but it may be desirable in certain applications to add solvent to solubilize components and aid in processing. Solvent, preferably an organic solvent, in an amount up to 99 weight percent, but preferable in the range of 0 to 90 weight percent, most preferably of 0, of the polymerizable composition can be used.

The process for polymerization of the composition may be completed in one step, or may be divided into several steps, where such is preferrable.

Where divided, the steps are preferably arranged in the following order. The first step is to mix the free-radically photopolymerizable monomer(s) with an effective amount of a free-radical initiator. Any bireactive monomers desired should be added in the fourth step, described, infra. Preferably, this free-radical initiator does not also function as a crosslinking agent.

The second step is to irradiate the composition, and allow it to polymerize so that the viscosity is increased. This will provide a partially polymerized syrup typically having a Brookfield™ viscosity of 300 to 20,000 centipoise at room temperature, preferably, from 500 to 2000 centipoise. The increased viscosity provides a syrup that is a more suitable coating composition for the production of pressure-sensitive adhesives. If a photoinitiator is used for this process, the partial polymerization may be stopped at any point simply by turning off the irradiation source. Alternatively, the syrup can be prepared by conventional thermal polymerization techniques and then quenched with air to attain the desired viscosity. Alternatively, the organometallic photoinitiator may be mixed with an alkyl acrylate monomer and then partially polymerized to form a syrup. The syrup can also be mixed with a viscosity adjusting agent, such as a hydrophilic silica to obtain a suitable viscosity for coating.

The third step is to mix the isocyanate reactive component into the syrup created in steps two and three.

The fourth step is to mix syrup with isocyanate component.

In one embodiment of the invention, the pressure-sensitive adhesive is a cellular pressure-sensitive adhesive, containing at least 15% voids made by the method of U.S. Pat. No. 4,415,615 (Esmay et al.) incorporated herein by reference. In such a method, the adhesive is frothed with a surfactant prior to coating, or simultaneously with polymerization.

The organometallic photoinitiator solution and an additional amount of free-radical initiator may be added at any time after the step two irradiation. The photoinitiators may be mixed with any component. The finished modified syrup may be coated onto a backing and exposed to energy to complete the polymerization. Suitable backings for the adhesives include paper, plastic films, vinyl (e.g. polyethylene and polypropylene, polyethylene terephthalate) and the like, metals, cloth and cellulose acetate. The backings may be release coated with, e.g., silicone or fluorochemical coatings. The composition may be either permanently or releasably bonded to the backing.

Alternatively, the composition may be made by mixing all monomers except the isocyanate with an effective amount of a free-radical initiator, partially polymerizing to increase viscosity, then adding the oganometallic complex salt and the isocyanate and following up by irradiation.

Temperature of polymerization and amount of catalyst will vary depending on the particular photopolymerizable composition used and the desired application of the polymerized product. The amount of the total photoinitiator system to be used in this invention should be a catalytically-effective amount under the desired use conditions. As previously stated, such amount generally will be in the range of about 0.01 to 20 weight percent, and preferably 0.02 to 5 weight percent, based on the weight of curable composition.

Solvents, preferably organic, can be used to assist in dissolution of the photoinitiator system in the free-radically polymerizable monomers and polyurethane precursors and as a processing aid. It may be advantageous to prepare a concentrated solution of the organometallic complex salt in a solvent to simplify the preparation of the photopolymerizable composition. Representative solvents include propylene carbonate, acetone, methyl ethyl ketone, cyclopentanone, methyl cellosolve acetate, methylene chloride, nitromethane, methyl formate, acetonitrile, gamma-butyrolactone, and 1,2-dimethoxyethane (glyme). In some applications, it may be advantageous to adsorb the photoinitiator onto an inert support such as silica, alumina, clays, etc., as described in U.S. Pat. No. 4,677,137 (Bany), incorporated herein by reference.

Compositions containing an organometallic complex salt of Formula I and a free-radical photoinitiator may be photopolymerized by exposure to any source of radiation, including and radiation sources emitting active radiation in the ultraviolet and visible region of the spectrum (e.g., about 200 to 800 nm). Suitable sources of radiation include mercury vapor discharge lamps, carbon arcs, tungsten lamps, xenon lamps, lasers, sunlight, and the like. The required amount of exposure to effect polymerization is dependent upon such factors as the identity and concentrations of the organometallic complex salt and free-radical photoinitiator, if any; the specific free-radically polymerizable monomers and the polyurethane precursors, thickness of the exposed material, intensity of the radiation source and amount of heat associated with the radiation.

For the multiple photoinitiation process, light of various wavelengths is preferably employed. Although a single cationic organometallic salt may be used to initiate both polyurethane and free-radical photopolymerizations, it is preferable to initiate each reaction with a separate initiator. These photoinitiators frequently have absorption maxima which differ from one another. In such case, use of light having substantially different wavelengths will generally be required. This increased control over the order of polymerization provides a consonent increase in the ability to control the final properties of the composition. Such light can be provided in a number of ways. Different light sources of substantially different wavelengths can be used. The wavelengths of major intensity for each light source can be obtained from examination of the spectral output of each source. One light source could be used for different wavelength regions through use of filters or monochromators. Lasers or other monochromatic light sources are also useful. For example, a tungsten lamp, whose output is mainly in the visible region, could be used as one light source while a lamp whose output is concentrated around 360 nm, e.g. a black light, could be used as another source.

Thermal polymerization using direct heating or infrared electromagnetic radiation, as it is known in the art, can be used to polymerize the free-radically polymerizable monomers and the polyurethane precursors according to the teachings of this invention.

It is within the scope of this invention to use multiple wavelengths by irradiating the photopolymerizable compositions either sequentially or simultaneously. In the preferred method, photopolymerization is effected by sequential exposure to a radiation source emitting active radiation in the visible region of the spectrum, followed by exposure to a radiation source in the ultraviolet region of the spectrum.

It is also preferred to heat before, during or after irradiation in the visible region. In addition, it may be desirable to subsequently thermally polymerize the activated precursor so obtained, the irradiation temperatures being below the temperature employed for subsequent heat postcuring. These activated precursors may normally be polymerized at temperatures which are substantially lower than those required for direct thermal polymerization, with an advantage in the range from 50° C. to 110° C. This process also makes it possible to control polymerization in a particularly simple and advantageous manner.

In the current state of the art, free-radical photopolymerization is carried out in an inert atmosphere. Any inert atmosphere such as nitrogen, carbon dioxide, helium or argon is suitable. A sufficiently inert atmosphere can be achieved by covering a layer of the photoactive mixture with a plastic film which is transparent to ultraviolet radiation and irradiating through that film in air. The composition should be kept in low light, or preferably total darkness, until ready for photopolymerization.

Adhesive tapes comprising adhesive layers of the invention may further comprise additional layers of similar or different adhesives. Where multilayer tape constructions are desirable, a preferred method of construction is multilayer coating, as described in U.S. Pat. Nos. 4,818,610 (Zimmerman et al.), 4,894,259 (Kuller) and 4,895,738 (Zimmerman et al.) all of which are incorporated herein by reference, wherein a plurality of copolymerizable coatable compositions is prepared, each composition containing at least one photopolymerizable monomer. One of the coatable compositions is the novel pressure-sensitive adhesive of the invention. The coatable compositions are coated to provide a plurality of superimposed layers with contiguous layers defining an interface therebetween, with the novel pressure-sensitive adhesive of the invention being coated as a first or last layer. Migration of photopolymerizable monomers through the interface between contiguous layers is permitted, and the superimposed layers are then simultaneously irradiated. This provides polymeric chains comprised of copolymers of free-radical photopolymerizable monomers originating from contiguous layers extending through the interface therebetween, thereby producing a tape having layers which cannot be delaminated.

Objects and advantages of this invention are further illustrated by the following examples, but they should not be construed as limiting the invention; the scope of which is defined by the claims.

All parts in the examples are listed as parts per weight unless otherwise noted. All flood lamps were 300 watt flood lights, available from General Electric Corp., (Cleveland, Ohio).

Test Methods

All examples were evaluated for tensile strength and percent elongation at break according to ASTM standard test number "D 638-89" using an Instron™ model 1122. Specimens were prepared using a type IV dye. Sample thickness was about 1 mm. The crosshead speed was 508 mm/min.

90° Peel

Peel adhesion to stainless steel was measured using 90° peel tests. 12 mm wide strips of adhesive were bonded to 0.2 mm thick aluminum strips to provide rigidity and support. The adhesive was then applied to stainless steel for a period of 3 days and then tested using a Syntec™ testing device.

The peel force was averaged over a distance of at least 100 mm.

Dynamic Shear

A 2.54 cm square sample of foam adhesive tape was placed onto 2.54 cm by 7.62 cm stainless steel strap, and rubbed to assure good bond. The liner was removed and a second identical strap was superimposed onto the exposed adhesive. The two straps overlap by 2.54 cm. The entire test panel was then rolled with a 6.8 kg roller one in each direction to insure a good bond. The panel was then allowed to dwell for three days. The panel is then placed into an Instron™ tensile tester, and pulled apart at 1.27 cm/minute. The force required to separate is reported in Newtons/dm.

T-Peel

T-Peel was measured as in ASTM test "D-1876-72" except that the test tapes were 1.27 m in width, and were after being adhered to aluminum foil backings for 2 hours. Only cohesive failures are reported.

GLOSSARY

FREE-RADICAL PHOTOINITIATORS

F-1 Irgacure™ 651 (Ciba Geigy Corp., Ardsley, N.Y.)

ORGANOMETALLIC PHOTOINITIATORS

O-1         (eta$^6$-mesitylene)(eta$^5$-cyclopentadienyl)iron(+1)hexafluorophosphate O-2 (eta⁶-xylenes(eta⁵-cyclopentadienyl)iron(+1)hexafluorophosphate O-3 (eta⁶-cumene)(eta⁵-cyclopentadienyl)iron(+1)hexafluorophosphate (Irgacure™ 261, Ciba Geigy Corp.)

O-4 (eta⁶-Fluorene)(eta⁵-cyclopentadienyl)iron(+1)hexafluorophosphate

O-5 (eta⁶-mesitylene)(eta⁵-cyclopentadienyl)iron(+1)hexafluoroantimonate

MISCELLANEOUS CATALYSTS

C-1 Dibutyltin dilaurate
C-2 Diphenyliodonium hexafluorophosphate

| | | Eqiv. Weight |
|---|---|---|
| DIOLS | | |
| D-1 | Desmophen ™ 670–80 (Mobay Corp, Pittsburgh, PA) | 500 |
| D-2 | Carbowax ™ 3350 (Union Carbide Corp, Danbury, CT) | 1675 |
| D-3 | Carbowax ™ 20000 (Union Carbide Corp, Danbury, CT) | 10000 |
| D-4 | Hydroxyethylated bisphenol-A | 157.5 |
| D-5 | Hydroxyethylated bisphenol of fluorenone | 219 |
| D-6 | Terathane ™ 2900 (Du Pont, Wilmington, DE) | 1450 |
| D-7 | Tone ™ 210 (Union Carbide Corp, Danbury, CT) | 428 |
| D-8 | A 1:1 by weight mixture of D-4 and D-7 | 292.75 |
| ISOCYANATES | | |
| I-1 | Desmodur ™ N100 (Mobay Corp., Pittsburgh, PA) | 191 |
| I-2 | IPDI, Isophorone diisocyanate | 114 |
| I-3 | A 1:1 by weight mixture of N100 and IPDI | 143 |
| I-4 | Desmodur ™ W (Mobay Corp.) | 137.7 |

FREE RADICAL MONOMERS

IOA Isooctyl acrylate
AA Acrylic acid
NVP N-Vinyl pyrrolidone
VDM Vinyldimethylazlactone
M-1 A mixture 83 parts IOA and 2 parts of AA
M-2 A mixture of 70 parts IOA and 15 parts of NVP
M-3 A mixture of 80 parts IOA and 5 parts VDM
M-4 A mixture of 65 parts IOA and 20 parts NVP
M-5 A mixture of 75 parts IOA and 10 parts NVP

MISCELLANEOUS

MEK Methyl ethyl ketone
HDDA 1,6-Hexanediol diacrylate
TMEMA Trimethylolethane monoacrylate
R972 Aerosil™ R972 Fumed Silica (Available from DeGussa Corp.)
C-15/250 Glass Microbubbles, (Available from 3M Co., St. Paul, Minn.)

Examples 1 and 2

These examples demonstrate the general utility of the invention to produce pressure sensitive adhesives with superior strength. A series of coatable compositions were prepared using the following procedure.

Prepolymerization was carried out by mixing eighty-five parts free radical monomer(s) with 0.04 part of free radical initiator, (F-1). The mixture was continuously stirred using a magnetic stirrer and degassed by bubbling nitrogen through the solution for at least five minutes. The mixture was then exposed to radiation from a blacklight for about 45 seconds. The reaction was allowed to go to about 10% acrylate conversion. This corresponded to a viscosity of about 1500 centipoise. To this prepolymer was added 10 parts of diol. The mixture was then heated on a water bath to about 80°–90° C. An additional 1 part of F-1 was added along with 0.03 part of inorganic cationic photocatalyst and 0.1 part HDDA. An amount of isocyanate was added to from about 0.95 to 1.05 equivalent of isocyanate per equivalent of diol. The jar was capped and shaken to achieve thorough mixing. The hot mixture was then degassed under vacuum to remove air bubbles and dissolved oxygen.

The mixture was coated using a knife edge coater, which was heated with infrared lamps just prior to coating. The mixture was coated between 15–25 cm wide polyester films, the films being coated with a release liner. The coater was divided into thee zones. Zone one consisted of four 300 watt flood lamps. Two lamps were suspended over the web and two lamps were placed under the web. The lamps were placed about 5 cm from the web. A 1.8 meter long heated bed was placed in zone one just after the flood lamps. The average surface temperature of the heated bed was 120° C. The effect of adding the heated bed was to increase conversion of the urethane prior to acrylate polymerization. Zone two consisted of a UV irradiation zone. UV exposure was 600 mJ/cm² as measured by an E.I.T. Rad Cure™ Radiometer.

Example 1 was postcured for 30 minutes at 100° C. Example 2 was not postcured. Compositions are listed in Table I. The test for these examples are shown in Table II. Examples 1 and 2 exhibited superior tensile strength when compared with comparative example C. The major effect of the heated bed in zone 1 was to eliminate the need for a separate post cure step.

Examples 3–4

These examples demonstrate that urethane precursors which polymerize to form segmented urethanes can be used with free-radical monomers to form pressure-sensitive adhesive. A syrup was prepared as in example 1 except that 15 parts of various diols were added as listed in Table I. The coating and polymerization procedure was the same as that used in example 1. Example 3 was post cured for 30 minutes at 100° C. Example 4 was not postcured.

Test results for these examples are shown in Table II. Results indicate that similar tensile and peel values were obtained for both examples. These examples exhibited superior tensile strength when compared with the comparative examples. The percent elongation at break and peel adhesion had values comparable to example 1. The effect of the heated bed in zone 1 was to eliminate the need for a separate postcure step.

TABLE I

| Example Number | Free Radical Monomer(s) | Diol | Isocyanate (parts) | Photo Initiator |
|---|---|---|---|---|
| 1 | M-4 | D-4 | I-3 (9.07) | O-1 |
| 2 | M-4 | D-4 | I-3 (9.07) | O-1 |
| 3 | M-4 | D-8 | I-3 (8.33) | O-1 |
| 4 | M-4 | D-8 | I-3 (8.33) | O-1 |

TABLE II

| Example Number | Tensile Strength (MPa) | Break Elongation (%) | Peel Force (N/dm) |
| --- | --- | --- | --- |
| 1 | 3.72 | 900 | 51.2 |
| 2 | 3.80 | 1160 | 56.2 |
| 3 | 3.81 | 870 | 58.4 |
| 4 | 3.92 | 1130 | 59.2 |

Examples 5 to 8 and Comparative Examples A B and C

These examples demonstrate the general utility of the invention to produce pressure sensitive adhesives with improved tensile strengths and equivalent surface properties. A series of coatable compositions were prepared using the following procedure.

Eighty-five parts free radical monomer were mixed with 15 parts diol. To this mixture was added 0.04 part of F-1. The mixture was continuously stirred using a magnetic stirrer. The mixture was then degassed by bubbling nitrogen gas through the solution for at least five minutes. The mixture was then prepolymerized by exposure to radiation from a blacklight lamp for about 45 seconds. The reaction was allowed to go to about 10% acrylate conversion, which corresponded to a viscosity of about 1500 centipoise. An additional 1 part of F-1 was added along with 0.03 part of inorganic organometallic photocatalyst and 0.1 part HDDA. An amount of isocyanate was added to provide from 0.95 to 1.05 equivalent of isocyanate per equivalent of diol. The jar was shaken to achieve thorough mixing. The mixture was then degassed under vacuum to remove air bubbles and dissolved oxygen.

The mixture was coated using a knife edge coater. The mixture was coated between 15.25 cm polyester films, which were coated with a release liner. The coater was divided into three zones. Zone one consisted of four 300 watt flood lamps. Zone two consisted of a UV irradiation zone. Total UV exposure was 600 mJ/cm² as measured by an E.I.T. Rad Cure™ Radiometer. The third zone was an oven where the sample postcured at 100° C. for at least 30 minutes.

For comparison, several typical pressure-sensitive adhesives were made. First, a syrup was manufactured and coated as in example 5 except using no diol, isocyanate or photo organometallic. This was a typical pressure-sensitive adhesive based on IOA. This was comparative sample A.

A syrup was manufactured and coated as in example 6 except using no diol, isocyanate or organometallic photoinitiator. This was a typical pressure-sensitive adhesive for an adhesive based on a copolymer of IOA and AA. This was comparative sample B.

A syrup was manufactured and coated as in example 7 except using no diol, isocyanate or organometallic photoinitiator. This was a typical pressure sensitive adhesive based on a copolymer of IOA and NVP. This was comparative sample C.

Compositions are listed in Table III. Results in Table II demonstrate the pressure sensitive adhesives prepared using the multiple photoinitiation process. Tensile strengths were superior to the values of the comparative examples. Elongations and peel strengths were comparable to the values of the comparative examples.

TABLE III

| | COMPOSITION | | | |
| --- | --- | --- | --- | --- |
| Example Number | Free Radical Monomer(s) | Diol | Isocyanate (parts) | Photo Initiator |
| 5 | IOA | D-1 | I-3 (4.28) | O-1 |
| 6 | M-1 | D-1 | I-3 (4.28) | O-1 |
| 7 | M-2 | D-1 | I-3 (4.28) | O-5 |
| 8 | M-3 | D-1 | I-3 (4.28) | O-1 |
| A | IOA | — | — | — |
| B | M-1 | — | — | — |
| C | M-2 | — | — | — |

TABLE IV

| | PROPERTIES | | |
| --- | --- | --- | --- |
| | Tensile Strength (Mpa) | Break Elongation (%) | Peel Force (N/dm) |
| 5 | 0.560 | 1180 | 104 |
| 6 | 0.570 | 610 | 80.0 |
| 7 | 0.652 | 830 | 113.6 |
| A | 0.239 | 1020 | 104.8 |
| B | 0.280 | 970 | 89.6 |
| C | 0.615 | 1060 | 128.8 |

Example 9

This example demonstrates the effect of adding diols to acrylate prepolymers syrup to produce pressure-sensitive adhesives. Coatable compositions were prepared using the following procedure.

Prepolymerization was carried out by mixing 85 parts free radical monomer(s) with 0.04 part of F-1. The mixture was continuously stirred using a magnetic stirrer. The mixture was then degassed by bubbling nitrogen gas through the solution for at least five minutes. The mixture was then exposed to radiation from a blacklight lamp for about 45 seconds. The reaction was allowed to go to about 10% acrylate conversion, which corresponded to a viscosity of about 1500 centipoise. An additional 1 part of F-1 is added along with 0.03 part of inorganic organometallic photocatalyst, 0.1 part HDDA and 15 parts diol. An amount of isocyanate was added to provide from 0.95 to 1.05 equivalent of isocyanate per equivalent of diol. The jar was capped and shaken to achieve thorough mixing. The mixture was then degassed under vacuum in a desiccator to remove air bubbles and dissolved oxygen.

The mixture was coated as described in Example 1 using a knife edge coater.

The composition is shown in Table V. The results in Table VI shows that the pressure-sensitive adhesives prepared using the above method have superior tensile strengths and elongations when compared with Comparative example C. Peel strength to stainless steel is comparable to that of Comparative example C.

Examples 10 to 20

These examples demonstrate the effect of preheating the final prepolymer mixture before the coating step. The procedure for these examples was the same as that for example 9 except that the final prepolymer mixture was heated in a water bath to about 90° C. just prior to coating. The processing conditions were also the same except that the knife coater was heated with infrared lamps for 30 minutes prior to coating. A series of coatable compositions were prepared and evaluated.

Compositions are shown in Table V. The results in Table VI show that preheating the syrup and the knife coater produced pressure-sensitive adhesives which exhibited superior tensile strength. Elongations and peel strengths were comparable to that of the comparative examples in all examples.

TABLE V

COMPOSITION

| Example Number | Free Radical Monomer(s) | Diol | Isocyanate (parts) | Photo Cat |
|---|---|---|---|---|
| 9 | M-2 | D-1 | I-3 (4.28) | O-5 |
| 10 | M-2 | D-1 | I-3 (4.28) | O-5 |
| 11 | IOA | D-2 | I-1 (1.47) | O-1 |
| 12 | IOA | D-2 | I-2 (0.77) | O-1 |
| 13 | IOA | D-3 | I-3 (1.12) | O-1 |
| 14 | IOA | D-3 | I-3 (0.21) | O-1 |
| 15 | IOA | D-3 | I-3 (0.21) | O-2 |
| 16 | IOA | D-3 | I-3 (0.21) | O-3 |
| 17 | IOA | D-3 | I-3 (0.21) | O-4 |
| 18 | M-1 | D-4 | I-3 (13.6) | O-1 |
| 19 | M-1 | D-5 | I-3 (13.0) | O-1 |
| 20 | M-5 | D-1 | I-3 (4.28) | O-2 |

TABLE VI

PROPERTIES

| Example Number | Tensile Strength (MPa) | Break Elongation (%) | Peel Force (N/dm) |
|---|---|---|---|
| 9 | 0.612 | 1800 | 148 |
| 10 | 1.08 | 1200 | 127 |
| 11 | 0.701 | 880 | 84.0 |
| 12 | 0.553 | 1210 | 106 |
| 13 | 0.531 | 920 | 83.2 |
| 14 | 1.341 | 780 | 97.6 |
| 15 | 0.913 | 860 | — |
| 16 | 1.153 | 960 | 75.2 |
| 17 | 1.044 | 960 | 77.6 |
| 18 | 3.94 | 810 | — |
| 19 | 2.21 | 500 | — |
| 20 | 1.13 | 900 | — |

Examples 21 to 26

These examples demonstrate the effect of varying the ratio of acrylate to urethane precursors on the properties of urethane-acrylates. A series of coatable compositions were prepared using diol D-3, isocyanate I-3, photocatalyst C-1 and free radical M-1. The procedure was the same as in examples 10 to 20 except that the relative amounts of acrylate, diol and isocyanate were changed. The composition and tensile and elongation properties are detailed in Table VII.

As mentioned supra, not all ratios of specific polyurethanes and acrylates, are useful as pressure-sensitive adhesives. Only those examples with percent elongation greater than or equal to 300% are considered formulations suitable for pressure-sensitive adhesives, however polymers with unique properties were obtained for all compositions.

TABLE VII

| Example Number | M-1 (parts) | D-3 (parts) | I-3 (parts) | Tensile Strength | Elongation (%) |
|---|---|---|---|---|---|
| 21 | 95 | 5 | 0.26 | 0.568 | 1370 |
| 22 | 90 | 10 | 0.51 | 0.834 | 1990 |
| 23 | 80 | 20 | 1.03 | 1.00 | 1300 |
| 24 | 70 | 30 | 1.53 | 2.33 | 320 |
| 25 | 50 | 50 | 2.56 | 3.88 | 121 |
| 26 | 20 | 80 | 2.05 | 10.85 | 117 |

Example 27

This example demonstrates the effect of eliminating the flood lamps in coater zone 1. The procedure and processing conditions were the same as that in examples 10 to 20 except that the flood lamps in zone 1 were turned off. The coated syrup received ultraviolet irradiation followed by heating for at least 30 minutes at 100° C. The composition of example 26 is shown in Table VIII.

As the tensile strength and percent elongation data in Table IX show, even with eliminating the lamps in zone 1, a pressure-sensitive adhesive with properties comparable to those of Comparative example A was produced.

Example 28

This example demonstrates the effect of varying the light irradiation sequence on the properties of the cured pressure sensitive adhesive. The procedure used to prepare the coatable syrup was the same as that in examples 10 to 20, except that the coated syrup was passed through irradiation zone 2 first, passed through irradiation zone 1 second and then postcured. The syrup formulation is shown in Table VIII.

Tensile strength, percent elongation, and peel strength data in Table IX show, that regardless of the sequence of irradiation, a pressure sensitive adhesive with properties comparable to those of Comparative example A, may be produced.

Example 29

This example demonstrate the effect of substituting a conventional thermal catalyst for the organometallic photocatalyst. The procedure used to prepare the syrup and polymerize the pressure-sensitive adhesive was the same as that described in example 5 except that 1.0 part of DBTDL, (C-1) was substituted for the organometallic photocatalyst, (O-2).

Results of tensile and peel tests are shown in Table IX. The composition of example 29 is the same as that as example 20. Example 20 show comparable tensile properties when compared with those of example 29. This result indicates that the organometallic photocatalyst is important in determining the final pressure-sensitive adhesive properties.

Example 30

This example demonstrates the effect of using an iodonium salt, C-2, in place of the free radical photoinitiator, F-1. The syrup was prepared according to the procedure used in example 5, except that 1.0 part of C-2 replaced F-1 in the formulation. The syrup formulation is shown in Table VIII.

Examples 31 and 32

These examples demonstrate that pressure-sensitive adhesives can be prepared when a bifunctional monomer is used is used in the syrup formulation. A series of coatable syrups were prepared and processed for coatings as described in examples 6 to 16, except that various amounts of TMEMA were added to the acrylate mixture prior to syrup formation and the syrup was formulated the amount of I-3 was changed as shown in Table VIII. In example 30, 0.06 part of TMEMA was incorporated into the syrup. In example 31, 0.07 part TMEMA was incorporated into the syrup.

TABLE VIII

| Example Number | Composition | | | |
|---|---|---|---|---|
| | Free Radical Monomer(s) | Diol | Isocyanate (parts) | Photo Cat |
| 27 | IOA | D-2 | I-3 (1.47) | O-2 |
| 28 | IOA | D-2 | I-3 (1.47) | O-2 |
| 29 | M-5 | D-1 | I-3 (4.28) | C-1 |
| 30 | M-4 | D-1 | I-3 (4.28) | C-2 |
| 31 | M-2 | D-7 | I-4 (9.25) | O-2 |
| 32 | M-2 | D-7 | I-4 (9.91) | O-2 |

TABLE IX

| Example Number | PROPERTIES | |
|---|---|---|
| | Tensile Strength (MPa) | Break Elongation (%) |
| 27 | 0.41 | 780 |
| 28 | 0.42 | 540 |
| 29 | 0.98 | 730 |
| 30 | 1.83 | 1160 |
| 31 | 0.46 | 1380 |
| 32 | 0.98 | 620 |

Examples 33 and 34 and Comparative Example D

These examples demonstrate that acrylate/urethane formulations can be frothed with nitrogen gas into a closed cell foam structure. The coatable mixture was prepared using the same procedure as in example 9, except that 85 parts of M-4 acrylate prepolymer was mixed with 15 parts of D-5. This mixture was heated to dissolve the diol and then cooled to room temperature. To this mixture was added 0.1 part of F-1, 0.05 part of O-2 and 12.33 parts of I-3.

The froth was prepared and coated as described in U.S. Pat. No. 4,415,615 (Esmay et al.). Example 33 was frothed at room temperature and example 34 was heated and frothed at 60° C. The samples were post cured for at least 30 minutes at 100° C. and at least 30 minutes at 140° C. Laminated to each side of the forth was an adhesive according to U.S. Pat. No. Re. 24,906 (Ulrich). Comparative example D was an acrylic single-layer foam tape made according to Esmay et. al. having 90 parts IOA, 10 parts AA, 12 parts Aerosil™ 972, and 0.1 part HDDA.

The results in Table X and Table XI show that froths with improved tensile strength and reduced density can be obtained compared with those of comparative example D.

Examples 35 and 36 and Comparative Examples E and F

Example 35 shows that a conformable syntactic foam can be prepared from acrylate and urethanes using glass bubbles and fumed silica. Example 36 shows that an unfilled tape made according to the invention has improved tensile and shear properties over a conventional adhesive.

The coatable mixture was prepared using the same procedure as described in example 10, except that 85 parts of M-4 acrylate prepolymer was mixed with 15 parts of D-4. This mixture was then heated with stirring to dissolve the diol. To the hot mixture was added 3 parts of Aerosil™ R972 fumed silica and 6 parts of C-15/250 glass bubbles. This mixture was vigorously stirred for at least 15 minutes in order to achieve good dispersion of the bubbles and fumed silica. An additional 0.1 part of F-1 was added along with 0.03 part of O-2, 0.1 part of HDDA and 12.5 parts of I-2. The jar was capped and thoroughly mixed. The mixture was then degassed under vacuum in a desiccator to remove air bubbles and dissolved oxygen.

Example 36 contained 85 parts M-4 prepolymer, 15 parts AA, 15 parts D-5, 12.33 parts I-3, 0.1 part F-1, and 0.05 part of O-2. The example was prepared, coated, cured, postcured and laminated as described in Examples 33 and 34.

Comparative example E was made according to U.S. Pat. No. 4,223,067 (Levens) containing 87.5 parts IOA, 12.5 parts AA, 8 parts glass microbubbles, 4 parts fumed silica, and 0.05 part HDDA. The sample was then knife coated and, to each side was laminated an adhesive disclosed in U.S. Pat. No. Re. 24,906.

Comparative Example F contains 90 parts IOA, 10 parts AA, 0.1 part HDDA, and 0.15 part F-1.

The results in Table X and Table XI show that improved properties can be obtained. These results show greater tensile strengths and shear values than those of comparative examples D, E and F.

Static shear testing was conducted as described in U.S. Pat. No. 4,330,590, (Vesley). Examples 33 and 34 held 1500 g at 70° C. for over 10,000 minutes. Comparative example D failed at 7785 minutes. Example 36 held 2,000 g at 70° C. for 1394 minutes; Comparative example F failed in 144 minutes. Likewise, at 158° C., example 36 held for over 10,000 minutes, comparative example F failed in 2,000 minutes.

TABLE X

| Example Number | Density (g/cm$^3$) | Tensile Strength (MPa) | Elongation (%) |
|---|---|---|---|
| 33 | 0.75 | 2.07 | 800 |
| 34 | — | 2.07 | 800 |
| 35 | — | 2.21 | 500 |
| 36 | — | 5.09 | 1500 |
| D | 0.80 | 0.63 | 825 |
| E | — | 1.21 | 775 |
| F | 0.99 | 3.65 | 1153 |

TABLE XI

| Example Number | Dynamic Shear (N/mm) | T-Peel (N/mm2) | Peel (N) |
|---|---|---|---|
| 33 | 0.624 | 265 | 206 |
| 34 | — | — | 248 |
| 35 | 0.600 | 157 | 167 |
| 36 | 0.600 | 272 | 296 |
| D | 0.620 | 244 | 296 |
| E | 0.620 | 401 | 491 |
| F | 0.3790 | 401 | 349 |

What is claimed is:

1. A pressure-sensitive adhesive composition comprising the polymerization reaction product of starting materials consisting essentially of:

(a) at least one free-radically polymerizable component selected from the group consisting of an acrylate, a methacrylate, and a vinyl ester;

(b) at least one polyurethane precursor component, said polyurethane precursor component comprising: (i) a least one di- or polyisocyanate; and (ii) at least one diol or polyol;

(c) at least one organometallic complex salt; and (d) at least one free-radical photoinitiator selected from the group consisting of: acetophenones, ketals, benzophenones, aryl gyloxylates, acylphosphine oxides and peroxides;

said reaction product being obtained by sequential exposure to visible electromagnetic radiation and then to ultraviolet electromagnetic radiation.

2. A composition according to claim 1, wherein said organometallic complex salt is of the structure $$[((L^1)(L^2)M)_b(L^3)(L^4)]^{+e} X_f$$

wherein:

M represents a metal atom selected from the elements of Periodic Groups IVB, VB, VIB, VIIB, and VIII; said organometallic salt having a mono- or bimetallic cation;

$L^1$ represents from zero to 3 ligands contribution pi-electrons that can be the same or different ligands selected from the group consisting of: substituted and unsubstituted acyclic and cyclic unsaturated compounds and groups, substituted and unsubstituted carbocyclic aromatic and heterocyclic aromatic compounds, each capable of contributing two to twelve pi-electrons to the valence shell of M;

$L^2$ represents from zero to 3 ligands contributing an even number of sigma-electrons that can be the same or different ligands selected from the group consisting of: mono-, di-, and tri-dentate ligands, each donating 2, 4, or 6 sigma-electrons to the valence shell of M;

$L^3$ represents from zero to 2 bridging ligands contributing pi-electrons that can be the same or different ligands selected from the group consisting of: substituted and unsubstituted acylic and cyclic unsaturated compounds and groups and substituted and unsubstituted carbocyclic aromatic and heterocyclic aromatic compounds, each capable of acting as a bridging ligand contributing 4 to 24 pi-electrons to the valence shells of two metal atoms M, simultaneously;

$L^4$ represents from zero to 3 bridging ligands contributing an even number of sigma-electrons that can be the same or different selected from the group consisting of: mono-, di-, and tri-dentate ligands, each donating 2, 4, or 6 sigma-electrons to the valence shells of two metal atoms M, simultaneously; the total electronic charge contributed to M by the ligands $L^1$, $L^2$, $L^3$, and $L^4$ plus the product of the ionic charge on M with b results in the residual positive charge of e to the cation;

b is an integer having a value of 1 or 2;

e is an integer having a value of 1 or 2, the residual electrical charge of the cation;

X is an anion selected from organic sulfonate anions and halogen-containing complex anions of a metal or metalloid; and f is an integer selected from 1 or 2, said integer being chosen such that the number of anions required will neutralize the positive charge e on the cation; and at least one free-radical photoinitiator selected from the group consisting of: substituted acetophenones, benzoin ethers, benzil ketals, substituted alpha-amino ketones, glyoxylates esters, and chromophore-substituted trihalomethyl-s-triazines.

3. The composition according to claim 1 wherein said free-radically polymerizable component is an alkyl acrylate or alkyl methacrylate wherein said alkyl group contains from about 4 to about 14 carbon atoms.

4. The composition according to claim 1 wherein the ratio of the isocyanate groups to hydroxyl groups present in said polyurethane precursor component is in the range of from about 1:2 to 2:1.

5. The composition according to claim 1 wherein the ratio of the isocyanate groups to hydroxyl groups in said polyurethane precursor component is in the range of from about 1:1.25 to 1.25:1.

6. The composition according to claim 1 wherein said organometallic complex salt has the following structure $$[(L^5)(L^6)M]^{+e} X_f$$

wherein:

M represents a metal atom selected from the group consisting of elements of the Periodic Groups IVB, VB, VIIB, and VIII;

$L^5$ represents from zero to three pi-electron contributing ligands that can be the same or different ligand selected from the group consisting of: substituted and unsubstituted acylic and cyclic unsaturated compounds and groups, and substituted and unsubstituted carbocyclic aromatic and heterocyclic aromatic compounds, each capable of contributing two to twelve pi-electrons to the valence shell of M;

$L^6$ represents from zero to 6 ligands that can be the same or different, contributing an even number of sigma-electrons, selected from the group consisting of: mono-, di-, and tri-dentate ligands, each donating 2, 4, or 6 sigma-electrons to the valence shell of M; the total electronic charge contributed to M by $L^5$ and $L^6$ plus the ionic charge on M results in a residual net positive charge of e to the complex;

e is an integer having a value of 1 or 2, the residual electrical charge of the cation;

X is an anion selected from the group consisting of: organic sulfonate anions and halogen-containing complex anions of a metal or metalloid; and f is an integer selected from 1 or 2, the number of anions required to neutralize the positive charge e on the cation.

7. The composition according to claim 1 wherein the organometallic complex salt has the following structure:

$$[(L^5)M]^{+3} X_f$$

wherein:

$L^5$ represents pi-electron contributing ligands that can be the same or different selected from the group consisting of: substituted and unsubstituted acyclic and cyclic unsaturated compounds and groups; and substituted and unsubstituted carbocyclic aromatic and heterocyclic aromatic compounds, each capable of contributing two to twelve pi-electrons to the valence shell of M; with the proviso that the total electronic charge contributed to M by $L^5$ plus the ionic charge on M results in a residual net positive charge of e to the complex;

e is an integer having a value of 1 or 2, the residual electrical charge of the cation;

X is an anion selected from organic sulfonate anions and halogen-containing complex anions of a metal or metalloid; and f is an integer selected from 1 or 2, the number of anions required to neutralize the positive charge e on the cation.

8. The composition according to claim 1 wherein said starting materials further comprise polar monomer copolymerizable with said at least one free-radically polymerizable component.

9. The composition according to claim 1 wherein said free-radically polymerizable component is partially polymerized to a syrup having a viscosity of from about 300 to 20,000 centipoise at room temperature.

10. The composition according to claim 1 wherein said polyisocyanate is an aliphatic polyisocyanate and said polyol is a hydroxy alkylated bisphenol.

11. The composition according to claim 1 comprising the polymerization reaction product of starting materials comprising:

(a) from about 60 to about 95 parts of said acrylate;

(b) from about 5 parts to about 40 parts of said at least one polyurethane precursor component comprising: (1) an hydroxy alkylated bisphenol selected from the group consisting of: hydroxyethylated bisphenol-A, and 9.9 bis[4-(2-hydroxyethoxy)phenyl]fluorene; and (2) at least one aliphatic polyisocyanate selected from the group consisting of: hexamethylene diisocyanate, the isocyanurate and the biuret thereof, and 4,4'-methylenebis(cyclohexylisocyanate);

(c) from about 0.01 part to about 10 parts of said organometallic complex salt, and (d) from about 0.01 to about 10 parts of said free-radical photoinitiator.

12. The composition according to claim 1 comprising the polymerization reaction product of starting materials comprising (a) from about 70 parts to 80 parts of isooctyl acrylate;

(b) from about 20 parts to about 30 parts of at least one hydroxy alkylated bisphenol selected from the group consisting of: hydroxyethylated bisphenol-A, and 9,9 bis[4-(2-hydroxy ethoxy)phenyl]fluroene; and at least one aliphatic polyisocyanate selected from the group consisting of: hexamethylene diisocyanate, the isocyanurate and the biuret thereof, and 4,4'-methylenebis(cyclohexylisocyanate), (c) from about 0.01 part to about 10 parts of (eta$^5$-cyclopentadienyl)(eta$^6$-xylene)iron(+1)hexafluorophosphate, (d) from about 0.01 to about 10 parts of 2,2-dimethoxy-2-phenylacetophenone; and (e) from 0 to about 1 part 1,6-hexanediol diacrylate.

13. The composition according to claim 12 wherein said starting materials further comprise from about 2 to about 5 parts of a bifunctional monomer.

14. The composition according to claim 12 further comprising a polar monomer copolymerizable with said acrylate.

15. The composition according to claim 14 wherein said polar monomer copolymerizable with said acrylate is selected from strongly polar and moderately polar monomers.

16. The composition according to claim 1 wherein said starting materials further comprise at least one adjuvant selected from the group consisting of: hydrophobic silica, glass microspheres, polymeric microspheres, and pigments.

17. A pressure-sensitive adhesive composition comprising the polymerization reaction product of starting materials consisting essentially of:

(a) at least one free-radically polymerizable component selected from the group consisting of an acrylate, a methacrylate, and a vinyl ester;

(b) at least one polyurethane precursor component, said polyurethane precursor component comprising: (i) at least one di- or polyisocyanate; and (ii) at least one diol or polyol;

(c) at least one organometallic complex salt; and (d) at least one free-radical photoinitiator selected from the group consisting of acetophenones, ketals, benzophenones, aryl gyloxylates, acylphonsphine oxides and peroxides;

the ratio of the total weight of said free-radically polymerizable component to the total weight of said polyurethane precursor component being from about 70:30 to about 90:10; said reaction product being obtained by sequential exposure to visible electromagnetic radiation and then to ultraviolet electromagnetic radiation.

18. A pressure-sensitive adhesive tape comprising at least one layer of the pressure-sensitive adhesive composition of claim 1 and a backing therefor.

19. A process for making a pressure-sensitive adhesive comprising the steps of:

(a) providing a composition comprising:
  (i) at least one free-radically polymerizable component selected from the group consisting of an acrylate, a methacrylate and a vinyl ester;
  (ii) at least one polyurethane precursor component, said polyurethane component comprising at least one di- or polyisocyanate and at least one diol or polyol;
  (iii) at least one organometallic complex salt; and
  (iv) at least one free-radical photoinitiator; said composition being substantially free of an onium salt;

(b) exposing said composition to a sufficient amount of visible electromagnetic radiation to activate said organometallic complex salt; and (c) thereafter exposing the photoreaction product obtained in step (b) to ultraviolet electromagnetic radiation to activate said free-radical photoinitiator;

wherein said process provides a pressure-sensitive adhesive.

* * * * *

UNITED STATES PATENT AND TRADEMARK OFFICE
CERTIFICATE OF CORRECTION

PATENT NO. : 5,462,797
DATED : October 31, 1995
INVENTOR(S) : Jerry W. Williams, Robert J. DeVoe, Thomas P. Klun
George F. Vesley and Patrick G. Zimmerman It is certified that error appears in the above-indentified patent and that said Letters Patent is hereby corrected as shown below:

On the title page: Item [56]

delete "Minneapolis" and insert --Minnesota--.

Col. 1, line 39, before "cellular" insert --discloses--.

Col. 20, line 27. delete "dye" insert --die--.

Col. 31, claim 11, line 8, delete "9.9" and insert --9,9--.

Signed and Sealed this

Fifth Day of March, 1996

Attest:

BRUCE LEHMAN

Attesting Officer

Commissioner of Patents and Trademarks